(12) United States Patent
Jiang et al.

(10) Patent No.: US 9,151,907 B2
(45) Date of Patent: Oct. 6, 2015

(54) OPTICAL FIBER CONNECTOR

(71) Applicants: Gloriole Electroptic Technology Corp., Kaohsiung (TW); SHEN ZHEN WONDERWIN TECHNOLOGY CO., LTD., Shen Zhen, Guang Dong Province (CN); Amphenol Fiber Optic Technology (Shenzhen), Shenzhen, Guangdong Province (CN); BAYCOM OPTO-ELECTRONICS TECHNOLOGY CO., LTD., Hsin Chu (TW)

(72) Inventors: Bo-Lin Jiang, Shenzhen (CN); Song-Sheng Li, Shenzhen (CN); Min Chen, Shenzhen (CN); Jun-Quan Bao, Shenzhen (CN); Jim Lin, Kaohsiung (TW); Chia-Hua Wu, Kaohsiung (TW)

(73) Assignees: GLORIOLE ELECTROPTIC TECHNOLOGY CORP., Kaohsiung (TW); SHEN ZHEN WONDERWIN TECHNOLOGY CO., LTD., Shen Zhen (CN); AMPHENOL FIBER OPTIC TECHNOLOGY (SHENZHEN), Shenzhen (CN); BAYCOM OPTO-ELECTRONICS TECHNOLOGY CO., LTD., Hsin Chu (TW)

( * ) Notice: Subject to any disclaimer, the term of this patent is extended or adjusted under 35 U.S.C. 154(b) by 0 days.

(21) Appl. No.: 14/312,321

(22) Filed: Jun. 23, 2014

(65) Prior Publication Data

US 2015/0212283 A1 Jul. 30, 2015

(30) Foreign Application Priority Data

Jan. 24, 2014 (TW) .............................. 103201569 U (51) Int. Cl.
*G02B 6/38* (2006.01)

(52) U.S. Cl.
CPC ............ *G02B 6/3893* (2013.01); *G02B 6/3898* (2013.01); *G02B 6/389* (2013.01)

(58) Field of Classification Search
CPC ..... G02B 6/389; G02B 6/3893; G02B 6/3898
See application file for complete search history.

(56) References Cited

U.S. PATENT DOCUMENTS

| 5,031,981 | A  * | 7/1991  | Peterson ........................ 385/56 |
| 6,799,898 | B2 * | 10/2004 | Cheng et al. .................... 385/56 |
| 7,020,376 | B1 * | 3/2006  | Dang et al. ..................... 385/135 |

(Continued)

FOREIGN PATENT DOCUMENTS

TW          M387259        8/2010

*Primary Examiner* — Rhonda Peace
(74) *Attorney, Agent, or Firm* — Muncy, Geissler, Olds & Lowe, P.C.

(57) ABSTRACT

An optical fiber connector includes a connector body and an actuating device. The connector body is adapted to connect with an adapter, and includes a main body portion having a tubular section, a resilient retaining arm portion extending inclinedly from the main body portion, and a pressing plate portion extending inclinedly from the main body portion. The actuating device includes a handle unit and two flexible rods extending from the handle unit and through the tubular section in the main body portion to connect with a free end of the pressing plate portion. The handle unit can be pulled to move the free end of the pressing plate portion to press a free end of the resilient retaining arm portion, thereby allowing for removal of the connector body from the adapter.

8 Claims, 15 Drawing Sheets

(56) References Cited

U.S. PATENT DOCUMENTS

| | | | |
|---|---|---|---|
| 7,297,013 B2* | 11/2007 | Caveney et al. | 439/352 |
| 8,500,470 B2* | 8/2013 | Wang et al. | 439/159 |
| 8,641,293 B2* | 2/2014 | Lin et al. | 385/77 |
| 8,873,921 B2* | 10/2014 | Lee et al. | 385/134 |
| 2005/0207719 A1* | 9/2005 | Nakano | 385/134 |
| 2009/0226140 A1* | 9/2009 | Belenkiy et al. | 385/134 |
| 2011/0019962 A1* | 1/2011 | Childers et al. | 385/76 |
| 2011/0286702 A1* | 11/2011 | Nielson et al. | 385/76 |
| 2013/0188913 A1* | 7/2013 | Yu et al. | 385/76 |
| 2014/0331464 A1* | 11/2014 | Jiang et al. | 29/283 |
| 2015/0030289 A1* | 1/2015 | Jiang et al. | 385/76 |
| 2015/0078717 A1* | 3/2015 | Lin | 385/134 |

\* cited by examiner

OPTICAL FIBER CONNECTOR

CROSS-REFERENCE TO RELATED APPLICATION

This application claims priority of Taiwanese Application No. 103201569, filed on Jan. 24, 2014.

BACKGROUND OF THE INVENTION

1. Field of the Invention

This invention relates to an optical fiber connector, and more particularly to an actuating device for an optical fiber connector.

2. Description of the Related Art

Figure 1:
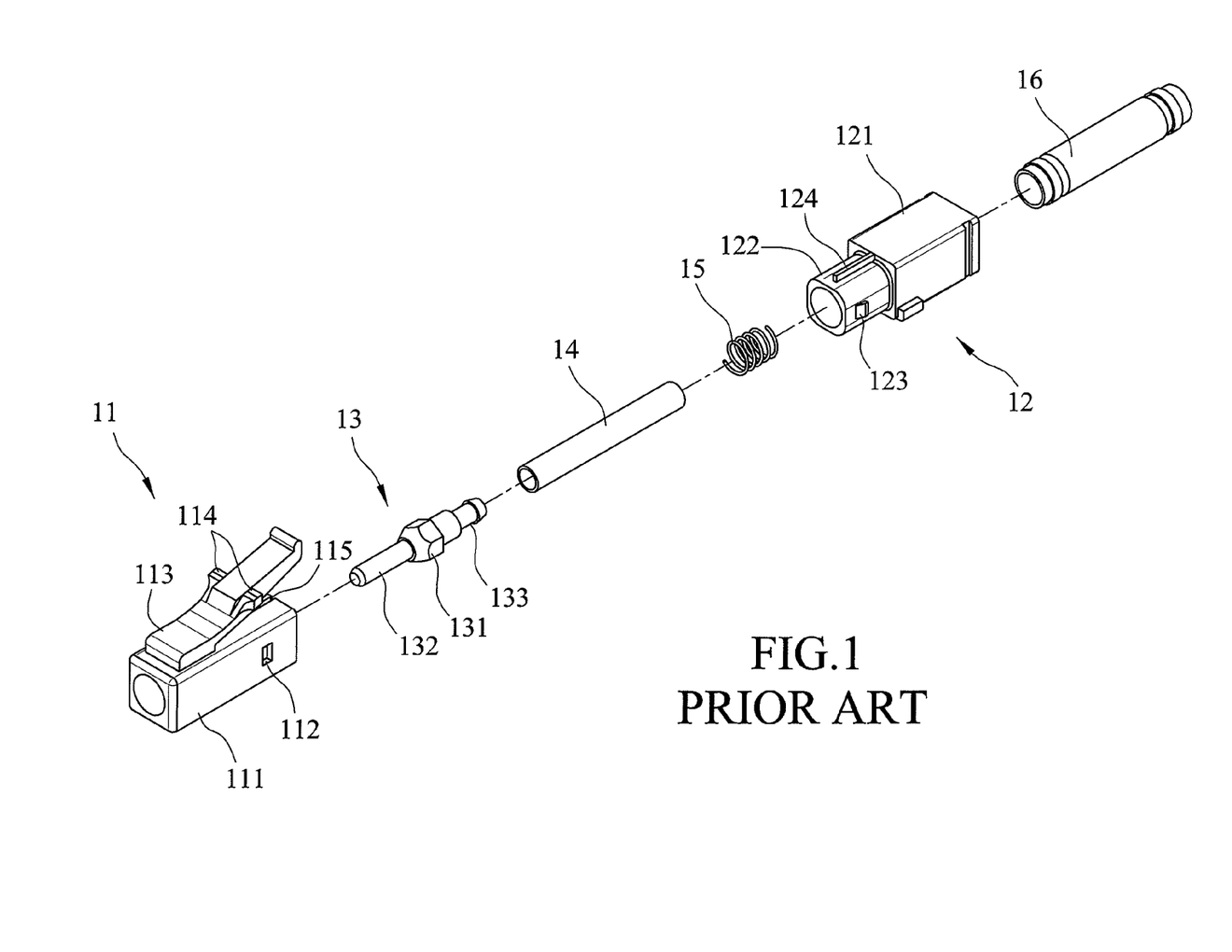
FIG. 1 is an exploded perspective view of a conventional optical fiber connector disclosed in Taiwanese Utility Model Patent Publication No. 387259.

Referring to FIG. 1, a conventional optical fiber connector disclosed in Taiwanese Utility Model Patent Publication No. M387259 is a lucent connector (LC), and includes a front housing 11, a rear housing 12 snap fitted into the front housing 11, a core tube 13 disposed in the front and rear housings 11, 12, an extension tube 14 having a front end portion sleeved on the core tube 13, a spring 15 sleeved on the core tube 13 and the extension tube 14, and an end sleeve 16 sleeved on the extension tube 14.

The front housing 11 includes a shell 111, two engaging holes 112 (only one is shown) formed respectively in two opposite sides of the shell 111, an inclined resilient retaining arm portion 113, two engaging blocks 114 extending respectively from two opposite sides of the pressing plate portion 113, and a guide slot 115 formed in the shell 111.

The rear housing 12 includes a base 121, a connecting portion 122 extending from the base 121 into the front housing 11, two engaging protrusions 123 (only one is shown) engaged respectively into the engaging holes 112 in the front housing 11, and a sliding rib 124 extending from the connecting portion 122 into the guide slot 115 in the front housing 11.

The core tube 13 has two opposite ends disposed respectively within the front and rear housings 11, 12, and includes a middle tube portion 131, a first insert needle 132 extending from one end of the middle tube portion 131, and a second insert needle 133 extending from the other end of the middle tube portion 131.

In use, the core tube 12 is inserted into the front housing 11 such that the sliding rib 124 moves in the guide slot 115, until a portion of the first insert needle 132 extends outwardly from the front housing 11. Subsequently, an optical fiber signal cable (not shown) is inserted into the core tube 131. Finally, the engaging protrusions 123 of the rear housing 12 are engaged respectively into the engaging holes 112 in the front housing 11. At this time, when the resilient retaining arm portion 113 is pressed to contact the shell 11, the front housing 11 can be inserted into an adapter (not shown), thereby allowing for transmission of a signal therethrough.

However, since the front housing 11 is connected between the adapter and the rear housing 12, and since only an upper portion of the resilient retaining arm portion 113 is exposed for manual operation, a region for the resilient retaining arm portion 113 to be pressed is limited. As such, it is difficult to perform an assembly and disassembly of the optical fiber connector and the adapter in a narrow space, thereby resulting in inconvenience during operation.

SUMMARY OF THE INVENTION

The object of this invention is to provide an optical fiber connector with an actuating device that is configured to allow the optical fiber connector to be removed easily and quickly from an adapter in a narrow space.

According to this invention, an optical fiber connector includes a connector body and an actuating device. The connector body is adapted to connect with an adapter, and includes a main body portion having a tubular section, a resilient retaining arm portion extending inclinedly from the main body portion, and a pressing plate portion extending inclinedly from the main body portion. The actuating device includes a handle unit and two flexible rods extending from the handle unit and through the tubular section in the main body portion to connect with a free end of the pressing plate portion. The handle unit can be pulled to move the free end of the pressing plate portion to press a free end of the resilient retaining arm portion, thereby allowing for removal of the connector body from the adapter.

As such, the optical fiber connector can be removed easily and quickly from the adapter by applying a pulling force to the handle unit.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 2:
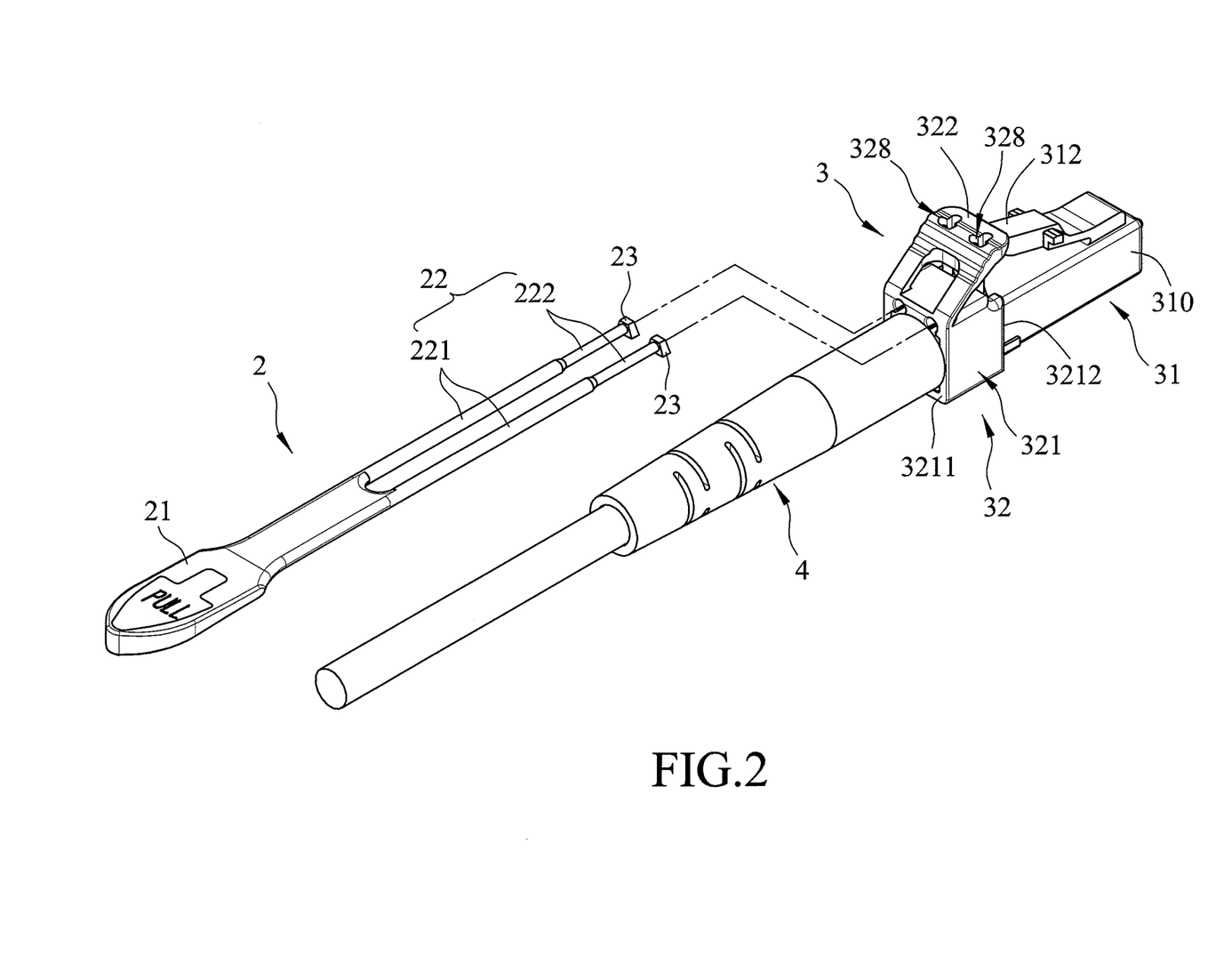
FIG. 2 is a partly exploded perspective view of the first preferred embodiment of an optical fiber connector according to this invention.

Referring to FIG. 2, the first preferred embodiment of an optical fiber connector according to this invention is a lucent connector (LC), and includes an actuating device 2 and a connector body 3. The actuating device 2 includes a handle unit 21, two spaced-apart flexible rods 22 extending from the handle unit 21 in a direction, and two coupling units 23 disposed respectively on free ends of the flexible rods 22. Each flexible rod 22 has a first rod section 221 extending from the handle unit 21, and a second rod section 222 extending from an end of the first rod section 221 distal from the handle unit 21 and having a diameter smaller than that of the first rod section 221. Each coupling unit 23 is disposed at a free end of the corresponding second rod section 222 (i.e., the free end of the corresponding flexible rod 22).

Figure 3:
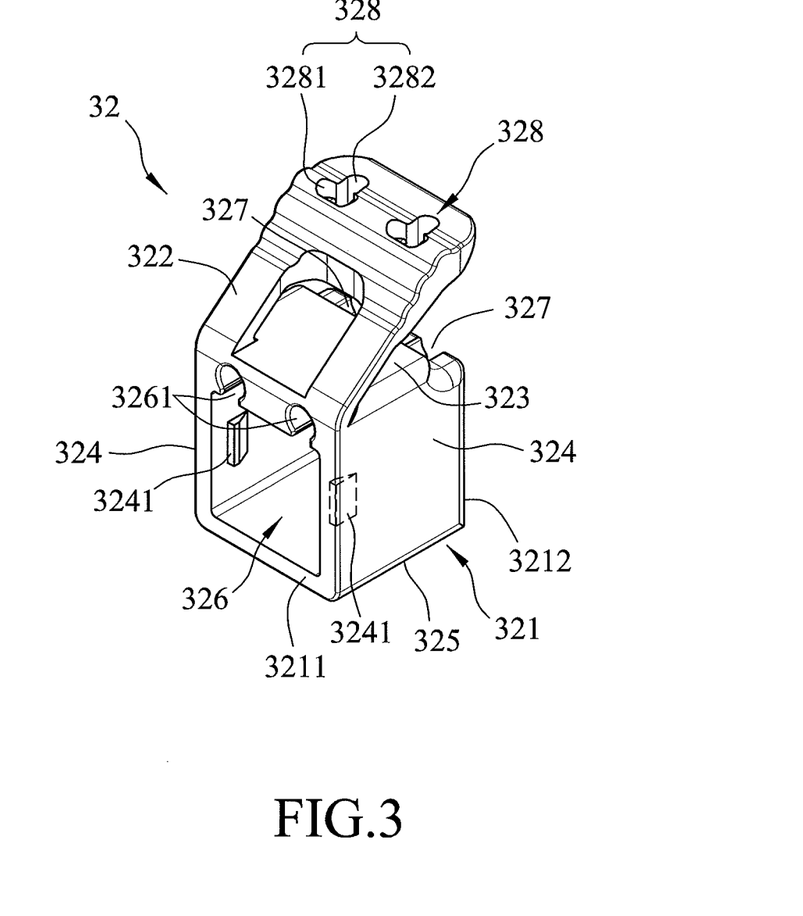
FIG. 3 is a perspective view of a socket member of the first preferred embodiment.
Figure 5:
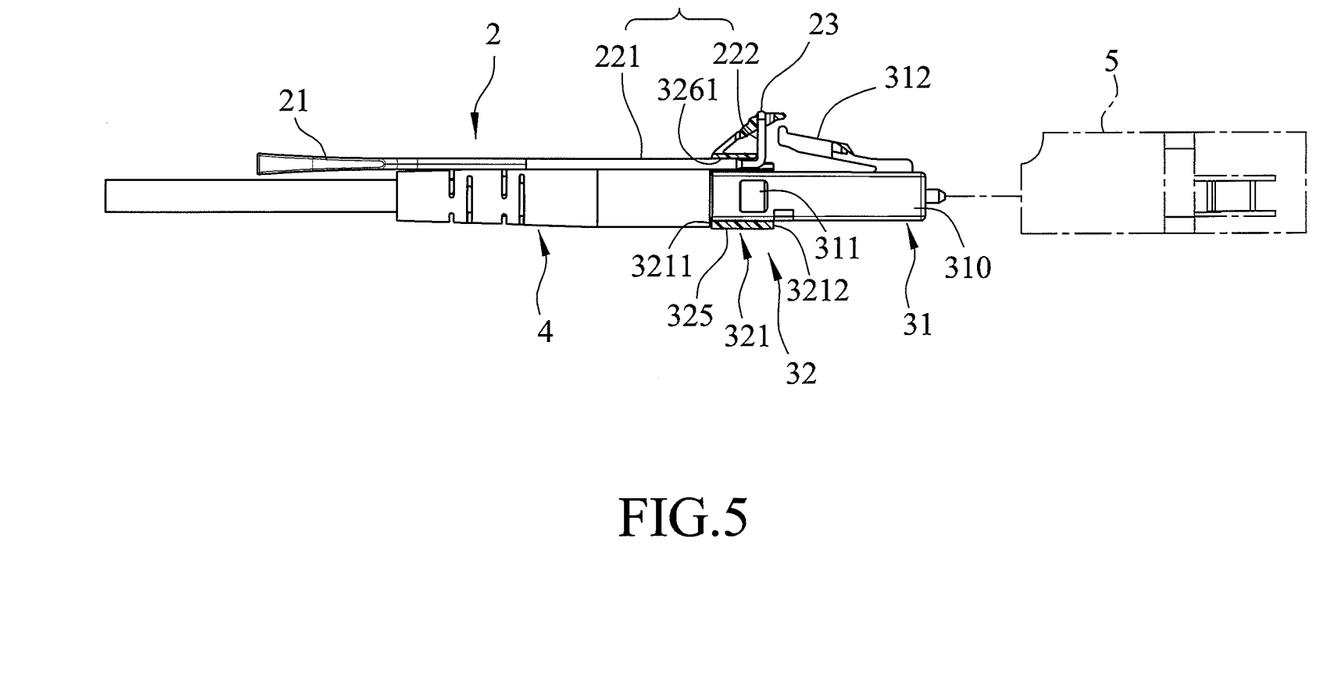
FIG. 5 is a partly sectional view of the first preferred embodiment.

With further reference to FIGS. 3 and 5, the connecter body 3 includes a plug member 31 having a plug body 310, and a socket member 32 connected removably to the plug body 310 of the plug member 31. Each of two opposite sides of the plug member 31 is formed with an engaging hole 311. A resilient retaining arm portion 312 extends inclinedly from a top surface of the plug body 310. The socket member 32 includes a tubular socket body 321 cooperating with the plug body 310 to constitute a main body portion of the connector body 3, and a pressing plate portion 322 extending inclinedly from the socket body 321. The socket body 321 includes a first inlet end 3211, a second inlet end 3212, a top wall 323, two side walls 324 extending respectively and downwardly from two opposite sides of the top wall 323, a bottom wall 325 disposed under the top wall 323 and having two opposite sides connected respectively to the side walls 324 to define a plug receiving space 326 for permitting insertion of the plug member 31, two slots 3261 extending through a bottom surface of the top wall 323 (i.e., extending from the first inlet end 3211 to the second inlet end 3212), and two notches 327 that are disposed at the second inlet end 3212 and under a free end of the pressing plate portion 322, that are opened upwardly, and that are in spatial communication with the slots 3261, respectively. Two engaging protrusions 3241 extend respectively from inner side surfaces of the side walls 324 of the socket body 321, and are adjacent to the first inlet end 3211. The free end of the pressing plate portion 322 has two holes 328 aligned vertically with the notches 327, respectively. Each hole 328 has a wide hole section 3281 and a narrow hole section 3282 connected to the wide hole section 3281 and narrower than the wide hole section 327. Each wide hole section 3281 is sized to allow for movement of the corresponding coupling unit 23 therethrough. Each narrow hole section 3282 is sized to prevent movement of the corresponding coupling unit 23 therethrough.

Figure 4:
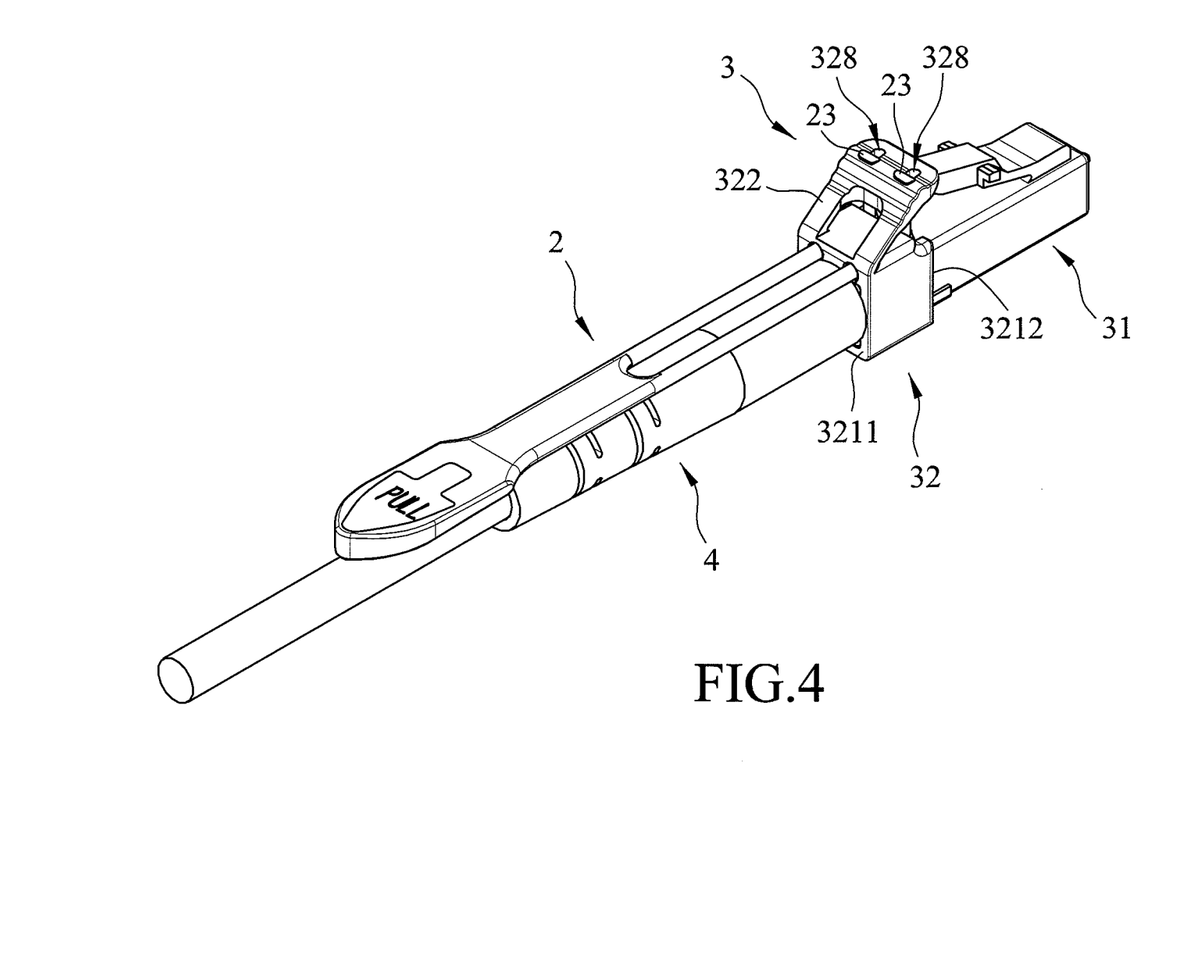
FIG. 4 is an assembled perspective view of the first preferred embodiment.

With particular reference to FIGS. 3, 4, and 5, an end of the plug member 31 is inserted into the plug receiving space 326 via the second inlet end 3212 such that the engaging protrusions 3241 are engaged respectively into the engaging holes 311 so as to prevent relative movement between the plug member 31 and the socket member 32. During assembly of the actuating device 2 and the connector body 3, the flexible rods 32 are inserted through the slots 3261 in the socket member 32, the notches 327, and the wide hole sections 3281 of the holes 328, such that the second rod sections 222 are bent from the first rod sections 221 toward the free end of the pressing plate portion 322. Subsequently, the flexible rods 22 are moved from the wide hole sections 3281 into the narrow hole sections 3282, so that the coupling units 23 are disposed above and on the free end of the pressing plate portion 322. Hence, as best shown in FIG. 5, the first rod sections 221 of the flexible rods 22 extend into the slots 3261, and the second rod sections 222 of flexible rods 22 extend outwardly from the slots 3261 through the notches 327 and into the holes 328 in the free end of the pressing plate portion 322, so that the flexible rods 22 are L-shaped. In this embodiment, each coupling unit 23 is configured as an abutment plate, and is connected fixedly to an end of the second rod section 222 of the corresponding flexible rod 22 distal from the first rod section 221 of the corresponding flexible rod 22.

With particular reference to FIGS. 4 and 5, in use, the plug member 31 is inserted into an adapter 5, and a coupler 4 connected to an optical fiber transmission cable (not shown) is inserted into the socket member 32 via the first inlet end 3211. Since connections among the plug member 31, the adapter 5, the coupler 4, the optical fiber transmission cable, and the socket member 32 are known in the art, further description thereof is omitted.

When it is desired to remove the plug member 31 from the adapter 5, it is only necessary to pull the handle unit 21 away from the plug member 31. Upon application of a pulling force to move the handle unit 21 away from the plug member 31, the free end of the pressing plate portion 322 is pressed downwardly by the coupling units 23 (i.e., pulled by the flexible rods 22) to contact and push the free end of the resilient retaining arm portion 312 toward the plug body 310, thereby allowing for manual removal of the plug member 31 from the adapter 5.

Figure 6:
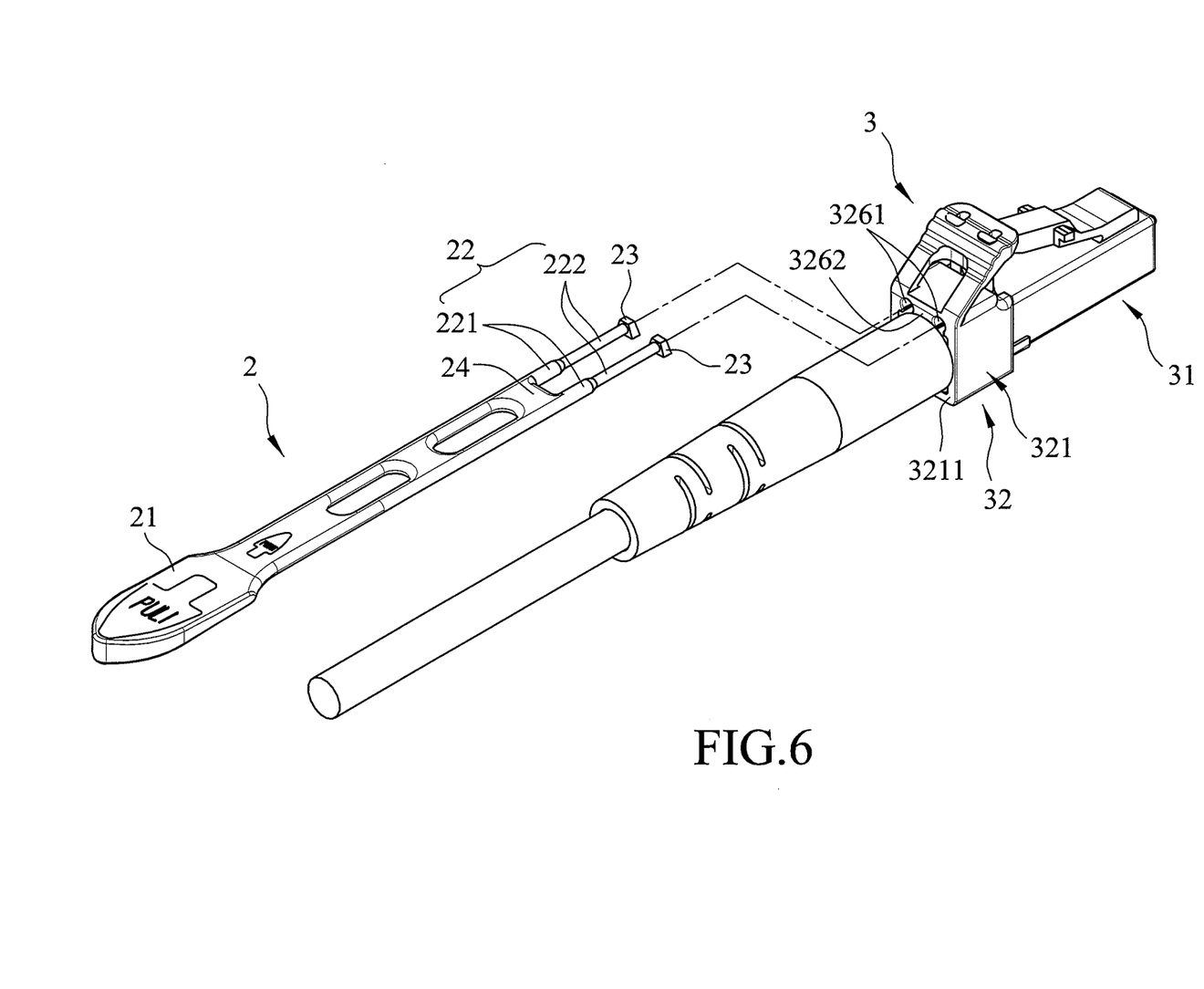
FIG. 6 is a partly exploded perspective view of the second preferred embodiment of an optical fiber connector according to this invention.
Figure 7:
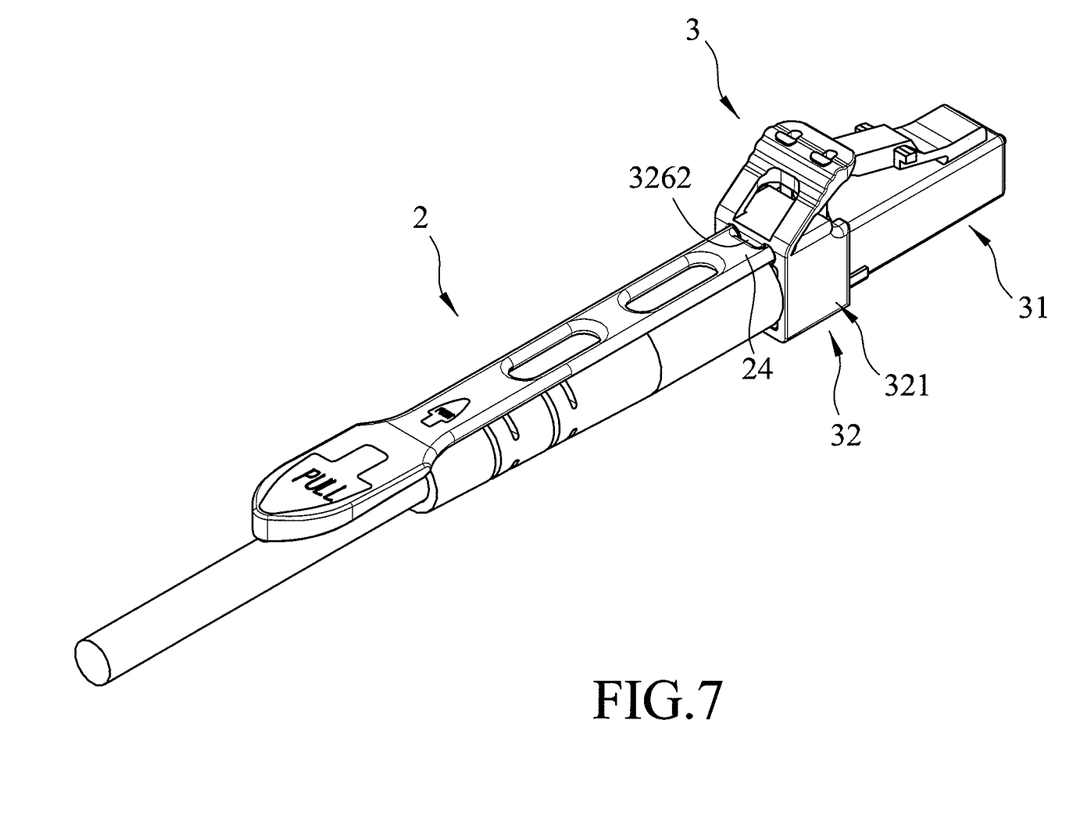
FIG. 7 is an assembled perspective view of the second preferred embodiment.
Figure 8:
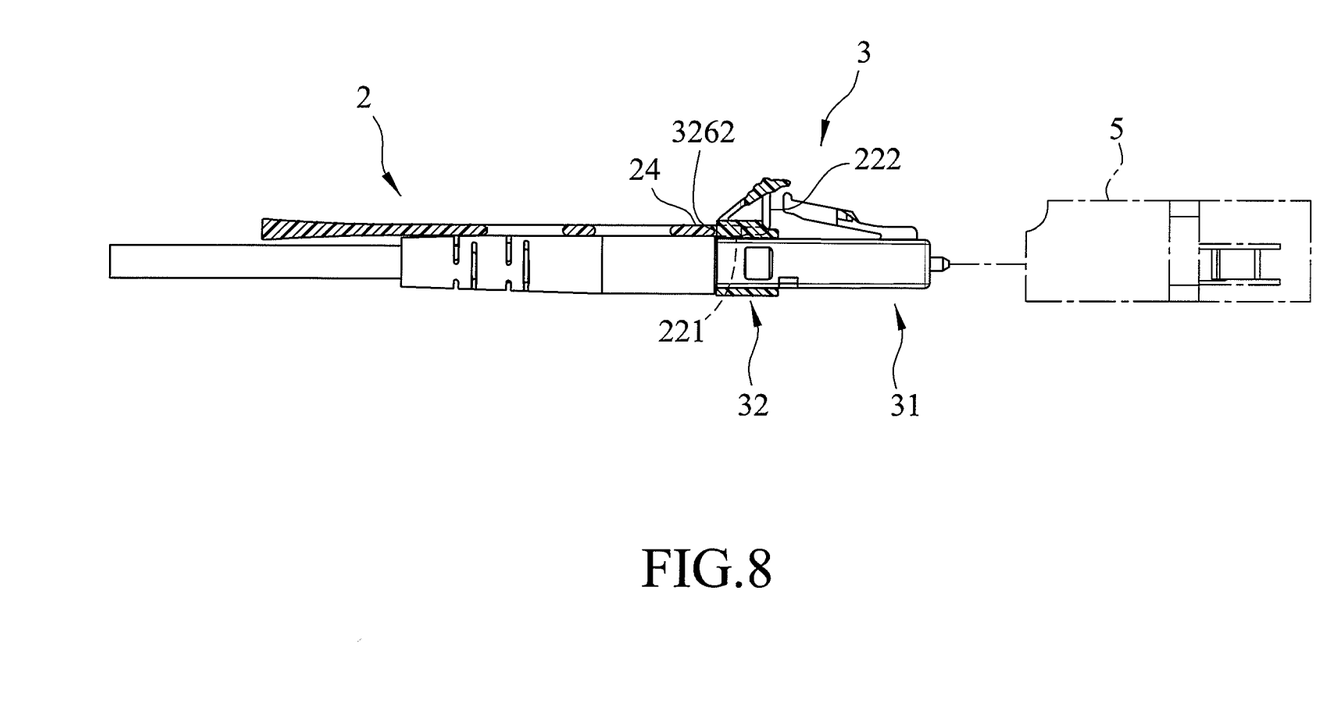
FIG. 8 is a partly sectional view of the second preferred embodiment.
Figure 9:
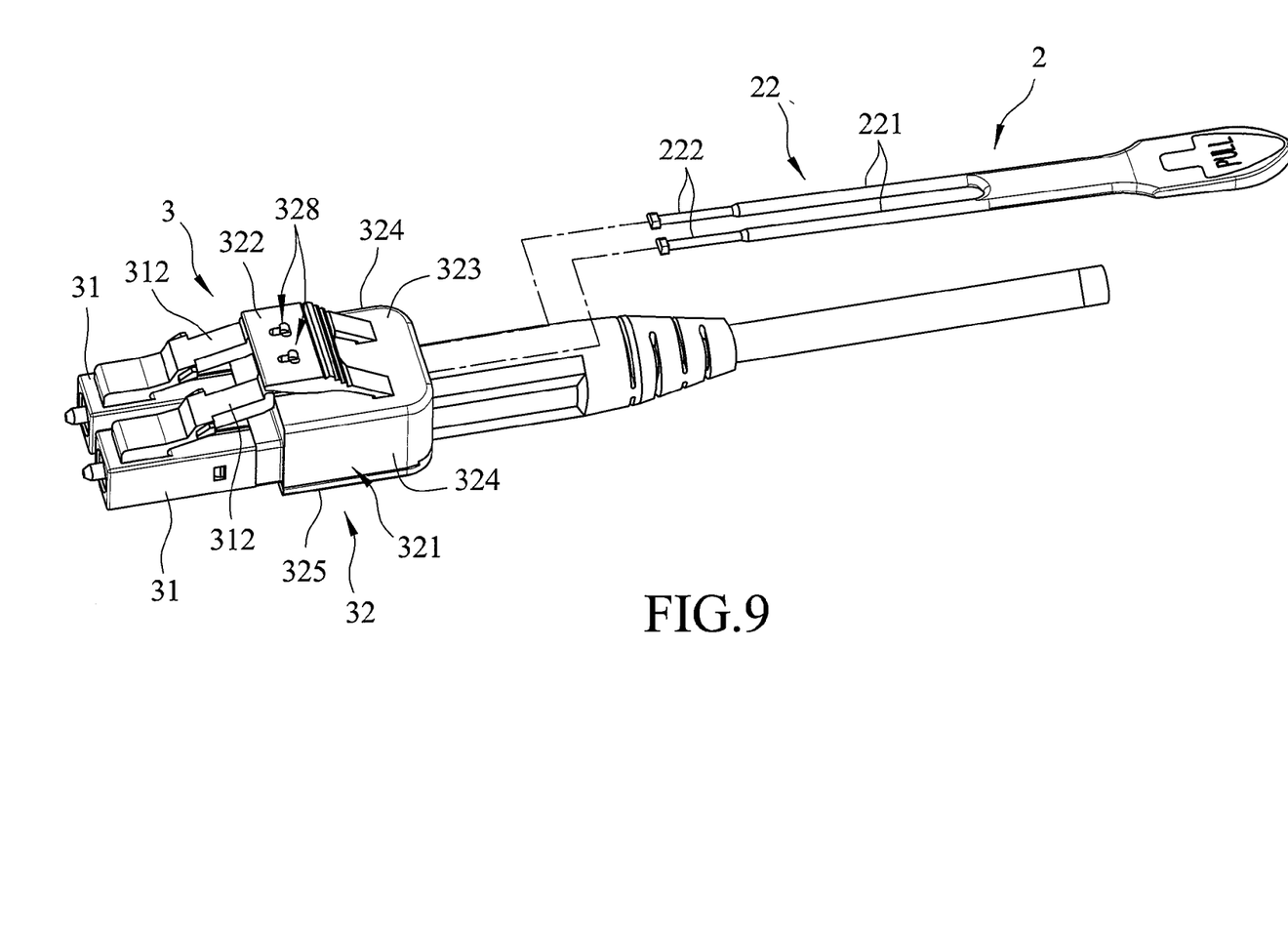
FIG. 9 is a partly exploded perspective view of a modified connector body.
Figure 10:
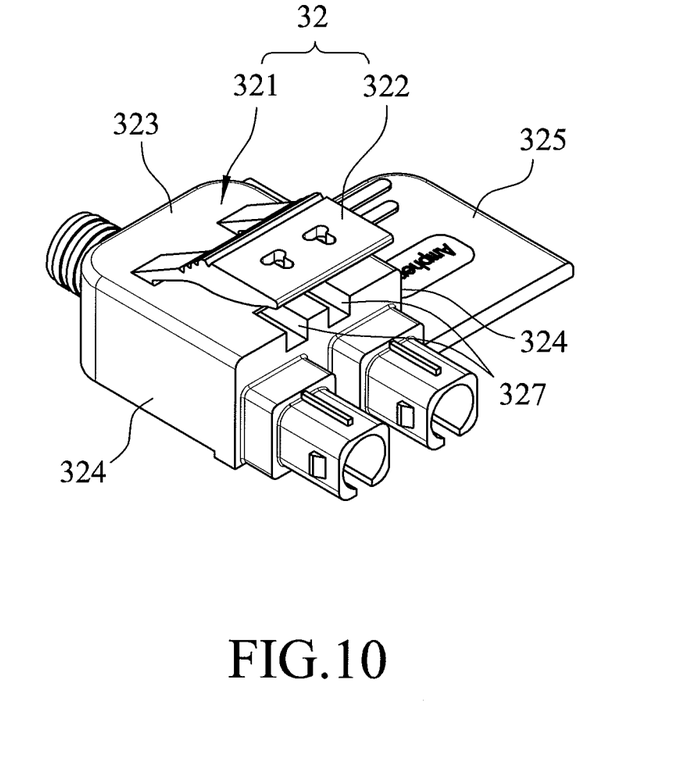
FIG. 10 is a perspective view of a socket member of the modified connector body.
Figure 11:
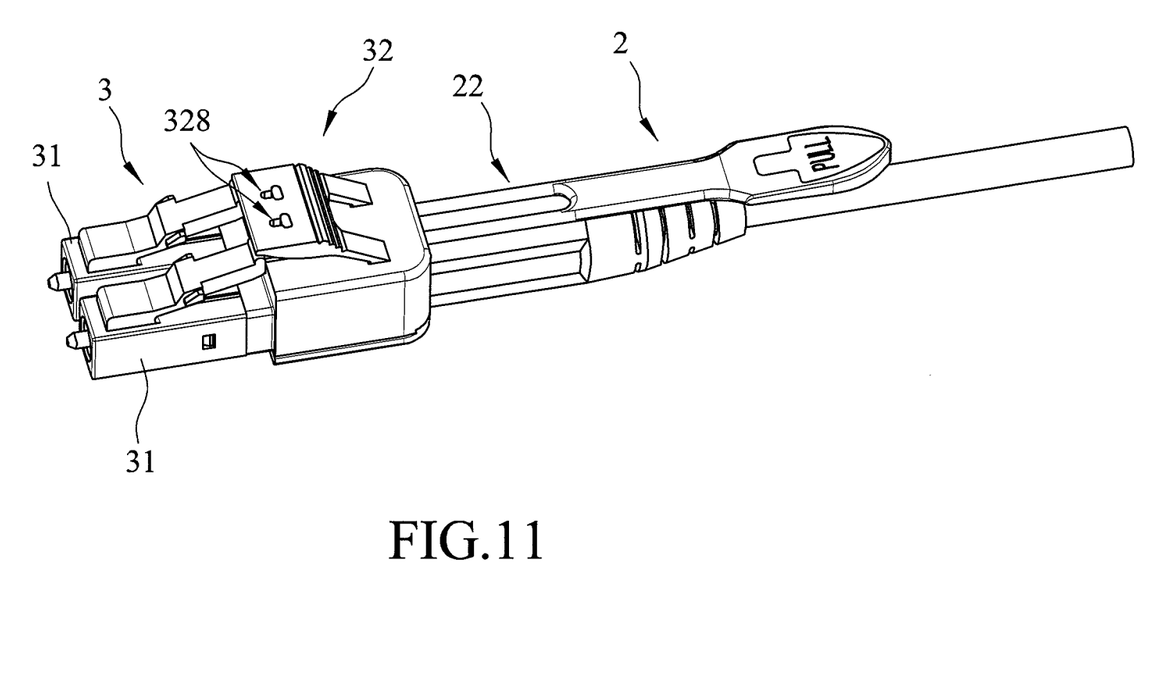
FIG. 11 is a perspective view of the third preferred embodiment of an optical fiber connector according to this invention, including the modified connector body and the actuating device of the first preferred embodiment.
Figure 12:
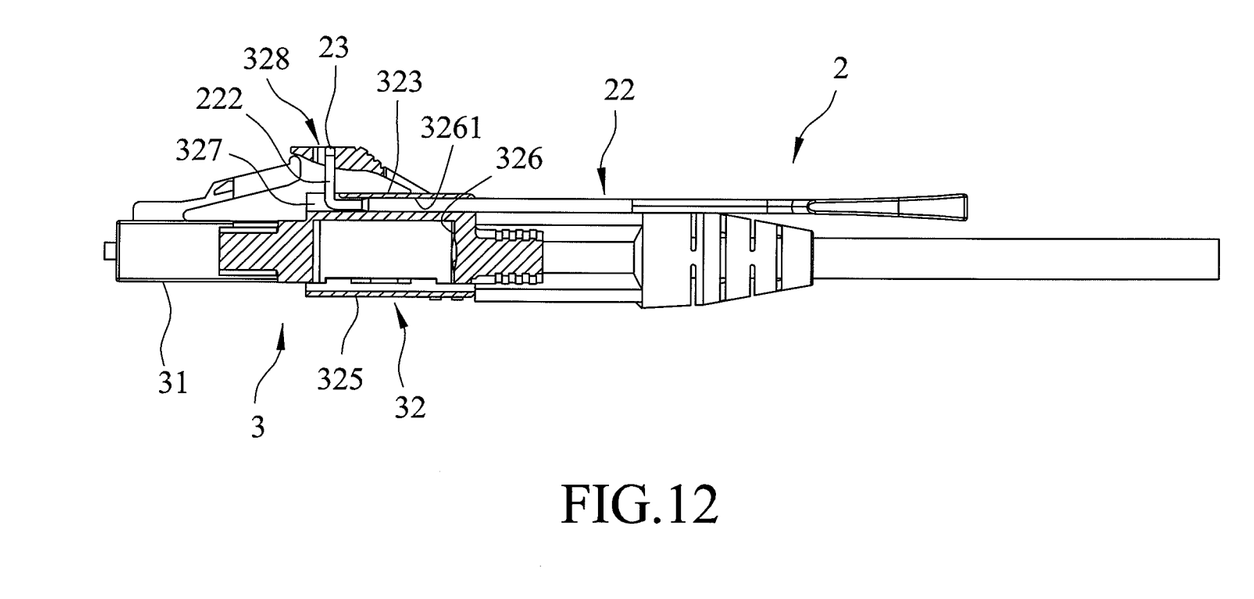
FIG. 12 is a partly sectional view of the third preferred embodiment.

FIGS. 6, 7, and 8 show the second preferred embodiment of an optical fiber connector according to this invention, which differs from the first preferred embodiment in that, the actuating device 2 further includes a push unit 24 connected between the first rod sections 221 of the flexible rods 22, and the connector body 3 further includes a stop member 3262 fixed in the first inlet end 3211 of the socket body 321. The push unit 2 is located between the stop member 3262 and the handle unit 21, and abuts against the stop member 3262. Since the push unit 24 is in contact with the stop member 3262, during assembly and when a pushing force is applied to the handle unit 21 to move the connector body 3 toward the adapter 5, the push unit 24 pushes the stop member 3262 to facilitate quick and easy assembly of the connector body 3 to the adapter 5. A process for removing the connector body 3 from the adapter 5 is the same as that of the first preferred embodiment.

FIGS. 9, 10, 11, and 12 show the third preferred embodiment of an optical fiber connector according to this invention, which is similar in construction to the first preferred embodiment. Unlike the first preferred embodiment, the connector body 3 includes two plug members 31 each having a structure the same as that of the plug member 31 of the first preferred embodiment, and a socket member 32 connected removably to the two plug members 31. In this embodiment, the free end of the pressing plate portion 322 is sized to allow for contact with the resilient retaining arms 312 of the two plug members 31.

Figure 13:
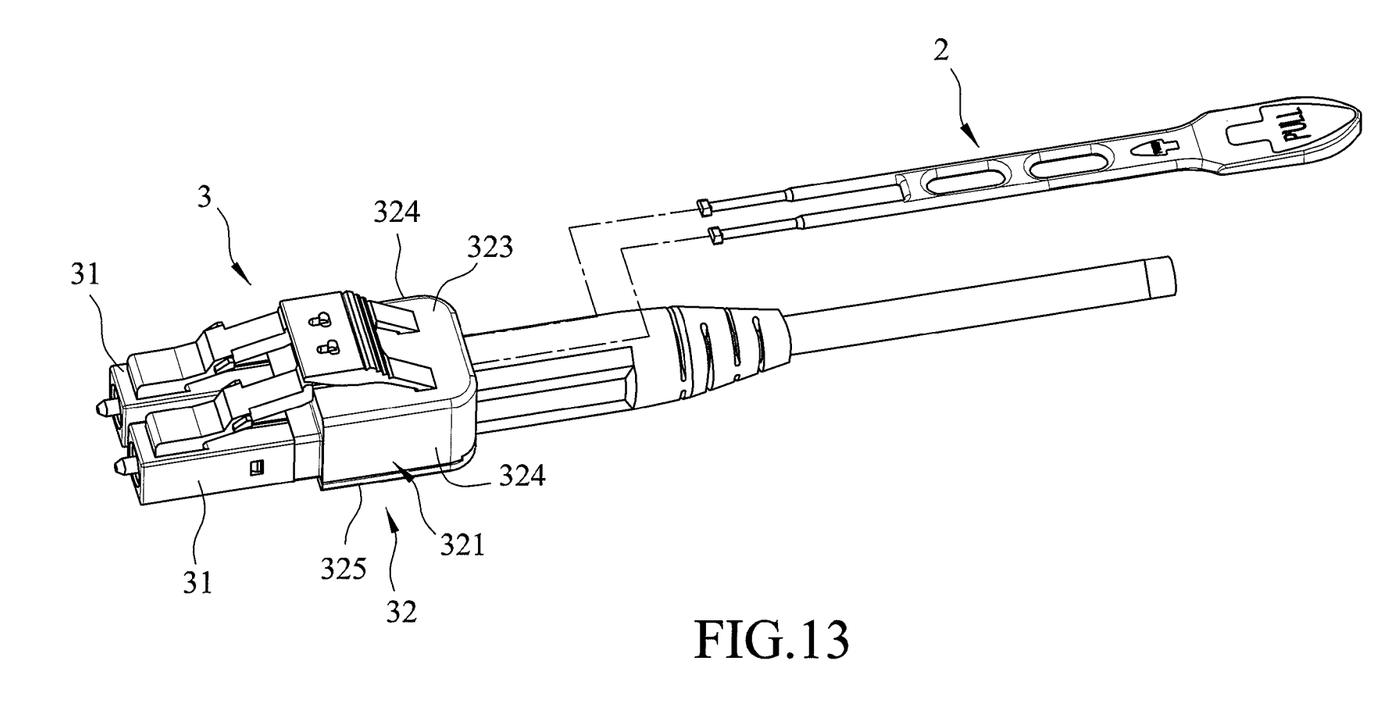
FIG. 13 is a partly exploded perspective view of the fourth preferred embodiment of an optical fiber connector according to this invention, including the modified connector body and the actuating device of the second preferred embodiment.
Figure 14:
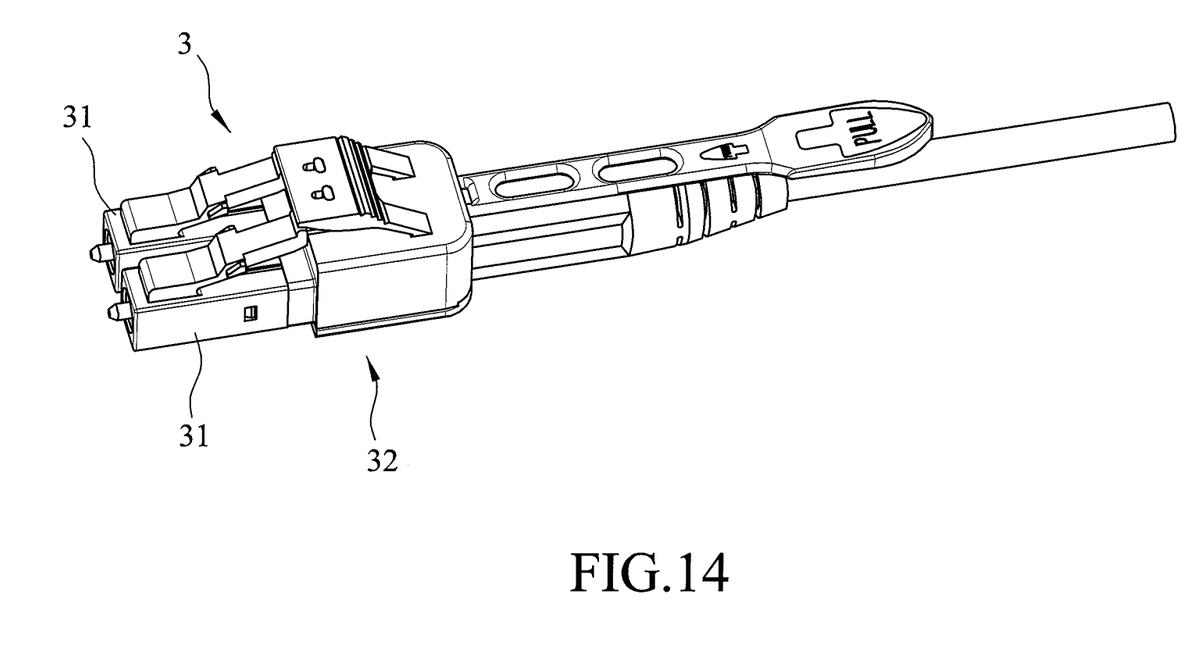
FIG. 14 is an assembled perspective view of the fourth preferred embodiment.

FIGS. 13 and 14 show the fourth preferred embodiment of an optical fiber connector according to this invention, which includes the actuating device 2 of the second preferred embodiment and the connector body 3 of the third preferred embodiment.

Figure 15:
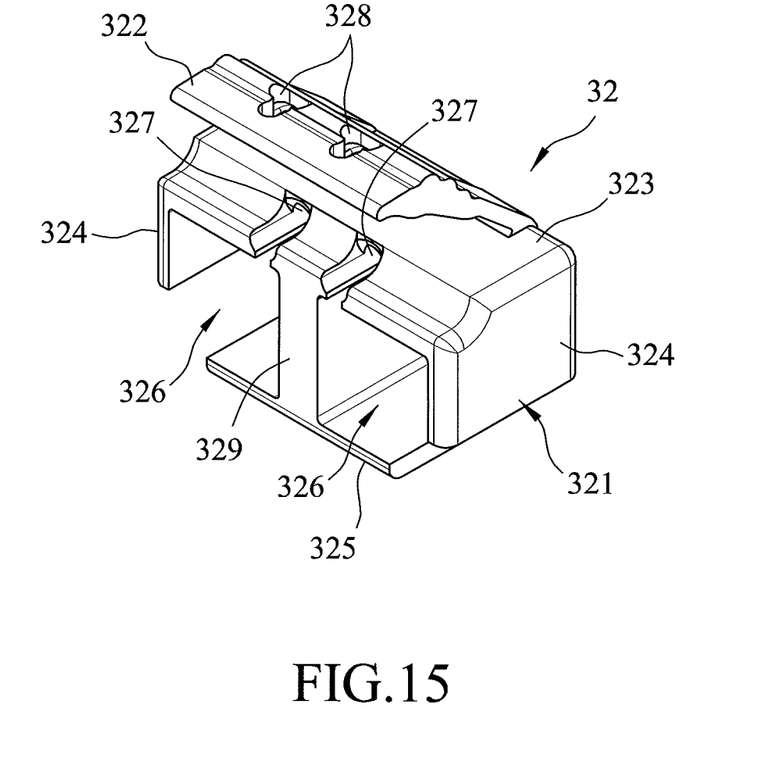
FIG. 15 is a perspective view of a socket member of the fifth preferred embodiment of an optical fiber connector according to this invention.

Referring to FIG. 15, the socket body 321 of the socket member 32 of each of the third and fourth preferred embodiments can be modified to include a top wall 323, two side walls 324 extending respectively and downwardly from two opposite sides of the top wall 323, a bottom wall 325 spaced apart from the side walls 324, and a spacer wall 329 extending downwardly from a middle portion of the top wall 323 to define two plug receiving spaces 326 each disposed among the spacer wall 329, the top wall 323, the bottom wall 325, and the corresponding side wall 324. Since the bottom wall 32 is spaced apart from the side walls 324, the two plug members 31 can be removed quickly and easily from the socket member 32. It should be noted that, the material of the socket body 321 of this embodiment can be saved.

In view of the above, when the handle unit 21 is pulled, removal of the connector body 3 from the adapter 5 is allowed. Since there is no need to operate directly the resilient retaining arm portion 312 with a hand, the connector body 3 can be removed quickly and easily from the adapter 5. Thus, the object of this invention is achieved.

With this invention thus explained, it is apparent that numerous modifications and variations can be made without departing from the scope and spirit of this invention. It is therefore intended that this invention be limited only as indicated by the appended claims.

What is claimed is:

1. An optical fiber connector comprising:
  a connector body adapted to connect with an adapter and including a main body portion having a tubular section, at least one resilient retaining arm portion extending inclinedly from and disposed above said main body portion and having a free end, and a pressing plate portion extending inclinedly from and disposed above said main body portion and having a free end positioned such that said free end of said resilient retaining arm portion is located between said main body portion and said free end of said pressing plate portion; and
  an actuating device including
    a handle unit,
    two spaced-apart flexible rods extending from said handle unit in a direction and through said tubular section in said main body portion, each of said flexible rods having a free end, and
    two coupling units disposed respectively on said free ends of said flexible rods for connecting said free ends of said flexible rods removably to said free end of said pressing plate portion of said connector body such that, said handle unit is movable away from said connector body so that said free end of said pressing plate portion of said connector body is pulled toward said main body portion of said connector body by said flexible rods to contact and push said free end of the resilient retaining arm portion toward said main body portion, thereby allowing said connector body to be removed manually from the adapter.

2. The optical fiber connector as claimed in claim 1, wherein each of said flexible rods further has a first rod section extending from said handle unit, and a second rod section extending from an end of said first rod section distal from said handle unit and having a free end constituting said free end of a corresponding one of said flexible rod, and a diameter smaller than that of said first rod section so as to permit said second rod section to be bent from said first rod section toward said free end of said pressing plate portion of said connector body.

3. The optical fiber connector as claimed in claim 2, wherein said connector body further includes at least one plug member having a plug body, and a socket member having a tubular socket body that is connected removably to said plug body of said plug member and that constitutes said tubular section of said connector body, said plug body of said plug member being inserted removably into said socket body of said socket member, said resilient retaining arm portion extending from said plug body, said pressing plate portion extending from said socket body.

4. The optical fiber connector as claimed in claim 3, wherein said socket body of said socket member includes a top wall, two side walls extending respectively and downwardly from two opposite sides of said top wall, a bottom wall disposed under said top wall and having two opposite sides connected respectively to said side walls, two slots extending through a bottom surface of said top wall, and two notches that are disposed at an end of said socket body and under said holes in said free end of said pressing plate portion, that are opened upwardly, and that are in spatial communication with said slots, respectively, said first rod sections of said flexible rods extending respectively into said slots, said second rod sections of flexible rods extending outwardly from said slots through said notches and into said holes in said free end of said pressing plate portion.

5. The optical fiber connector as claimed in claim 3, wherein said connector body further includes two said plug members.

6. The optical fiber connector as claimed in claim 2, wherein said connector body further includes a stop member fixed in said main body portion, and said actuating device further includes a push unit connected between said first rod sections of said flexible rods, located between said stop member and said handle unit, and abutting against said stop member.

7. The optical fiber connector as claimed in claim 2, wherein said free end of said pressing plate portion of said connector body has two holes permitting said flexible rods to extend respectively therethrough, each of said coupling units being configured as an abutment plate that is disposed above and on said free end of said pressing plate portion.

8. The optical fiber connector as claimed in claim 1, wherein each of said holes has a wide hole section sized to allow for movement of a corresponding one of said coupling units therethrough, and a narrow hole section that is connected to the wide hole section, that is narrower than said wide hole section, and that is sized to prevent movement of the corresponding one of said coupling units therethrough, said second rod sections of said flexible rods extending respectively through said narrow hole sections of said holes and being movable into said wide hole sections so as to allow for removal of said flexible rods from said free end of said pressing plate portion.

* * * * *